Jan. 19, 1954 C. J. HIRSCH 2,666,576

ELECTRICAL COMPUTER

Filed May 11, 1951 3 Sheets-Sheet 1

INVENTOR.
CHARLES J. HIRSCH

BY Laurence B. Dodds

ATTORNEY

INVENTOR.
CHARLES J. HIRSCH
BY Laurence B. Dodds
ATTORNEY

INVENTOR.
CHARLES J. HIRSCH
BY Laurence B. Dodds
ATTORNEY

Patented Jan. 19, 1954

2,666,576

UNITED STATES PATENT OFFICE 2,666,576

ELECTRICAL COMPUTER

Charles J. Hirsch, Douglaston, N. Y., assignor to Hazeltine Research, Inc., Chicago, Ill., a corporation of Illinois Application May 11, 1951, Serial No. 225,721

15 Claims. (Cl. 235—61)

GENERAL

Figure 1:
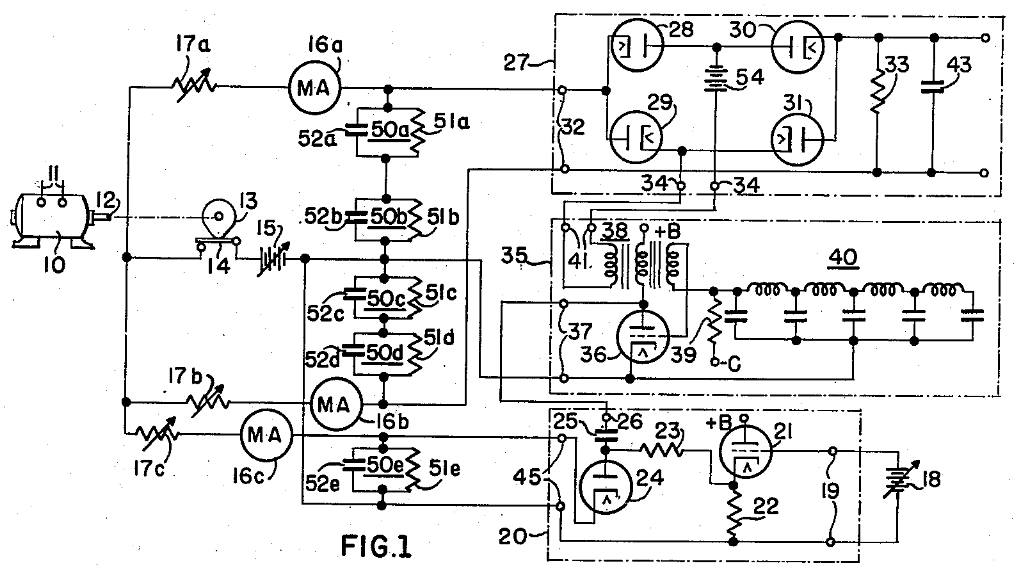

This invention relates to electrical computers for solving equations involving known and unknown parameters, and particularly to computers designed to solve equations involving mathematical series. The subject matter of this application is related to that of applicant's copending applications, Serial No. 12,633, filed March 2, 1948, and Serial No. 119,637, filed October 5, 1949, both entitled "Electrical Computer."

One general type of prior computer, which may be referred to as a digital computer, includes relay machines, punch-card machines, and adding and multiplying machines utilizing either mechanical or electrical counting devices. Conventional computers of this type can handle numerical data after the problem has been reduced to a numerical routine susceptible to solutions by digital methods often requiring extensive programming of the operation of the machine. These computers are inherently capable of very high accuracies, the accuracy usually being limited only by the number of places to which a computation is carried out, but the machine may have to perform a very extensive counting operation to solve even a simple algebraic expression. Conventional computers of this type tend to be bulky and cumbersome in operation, particularly when the problem is at all complex as in the case of mathematical series.

Another type of prior art computer may be classified generally as a continuouly variable computer. Computers of this type deal with quantities by continuous correlation with mechanical displacements or electrical effects. Tachometer instruments come under this classification. These computers are known in the trade as analogue computers. The electronic analogue computers use techniques which are similar to those conventionally used in the field of communications whereas the digital computer uses techniques similar to those used in the field of pulse-modulation systems. Insofar as is known, computers of the analogue type are not capable of solving equations involving mathematical series without setting up a computer for each term of the series and then manually or by means of another computer adding the values obtained for each term. Such an arrangement is undesirable.

Compared with digital computers, the analogue computers usually have the advantage of high speed and facility of setting up the computer to solve a given problem, but have the disadvantage that their accuracy tends to be lower. Usually analogue computers are more suitable for small scale problems that do not justify extensive programming to provide an approximate answer to such problems. Simple analogue computers capable of solving mathematical series are unknown. If a more elaborate arrangement as described above is used, then in spite of the size and complexity of the equipment utilized, such equipment is very limited in the parameter values which may be used.

It is an object of the present invention, therefore, to provide a new and improved electrical computer which avoids one or more of the limitations and disadvantages of prior computers.

It is another object of the invention to provide a new and improved electrical computer capable of solving equations involving mathematical series.

It is a further object of the invention to provide a new and improved electrical computer which does not require mechanical moving parts, is compact and light in weight, yet is capable of making complex computations at high speeds.

It is a still further object of the invention to provide a new and improved electrical computer capable of continuously and rapidly calculating a problem involving parameters subject to change.

It is still another object of the invention to provide a new and improved electrical computer for performing mathematical operations in which all of the independent and dependent variables are represented by voltages referred to a convenient reference voltage.

In accordance with the invention, an electrical computer for solving equations involving mathematical series including known and unknown parameters comprises means for supplying an electrical signal and a plurality of networks at least some of which are electrically coupled in series relation with each other and with the supplying means. Each of these networks has circuit elements so proportioned that the impedances of said networks are proportioned with respect to each other in the ratio of individual ones of one group of components of the terms of said mathematical series and the time constants of said networks are proportioned with respect to each other in the ratio of individual ones of another group of components of the terms of said mathematical series so that upon application of the above-mentioned electrical signal to these networks there are developed therein electrical effects varying as predetermined time functions which at a predetermined instant of time reach in individual ones of the networks values, representative of different ones of the terms of the mathematical series. The computer also includes a source of potential having a value representative of a known parameter at said predetermined instant of time, and means responsive jointly to this potential and at least one of the abovementioned electrical effects at the aforesaid instant of time for developing a control effect. In addition, the computer includes a signal-sampling circuit responsive to the control effect and coupled to at least one of the networks for determining the value of the aforesaid electrical effects developed therein at the aforementioned instant of time to derive a resultant electrical effect representative of the value of an unknown parameter of the mathematical series.

For a better understanding of the present invention, together with other and further objects thereof, reference is had to the following description taken in connection with the accompanying drawings, and its scope will be pointed out in the appended claims.

Figure 3:
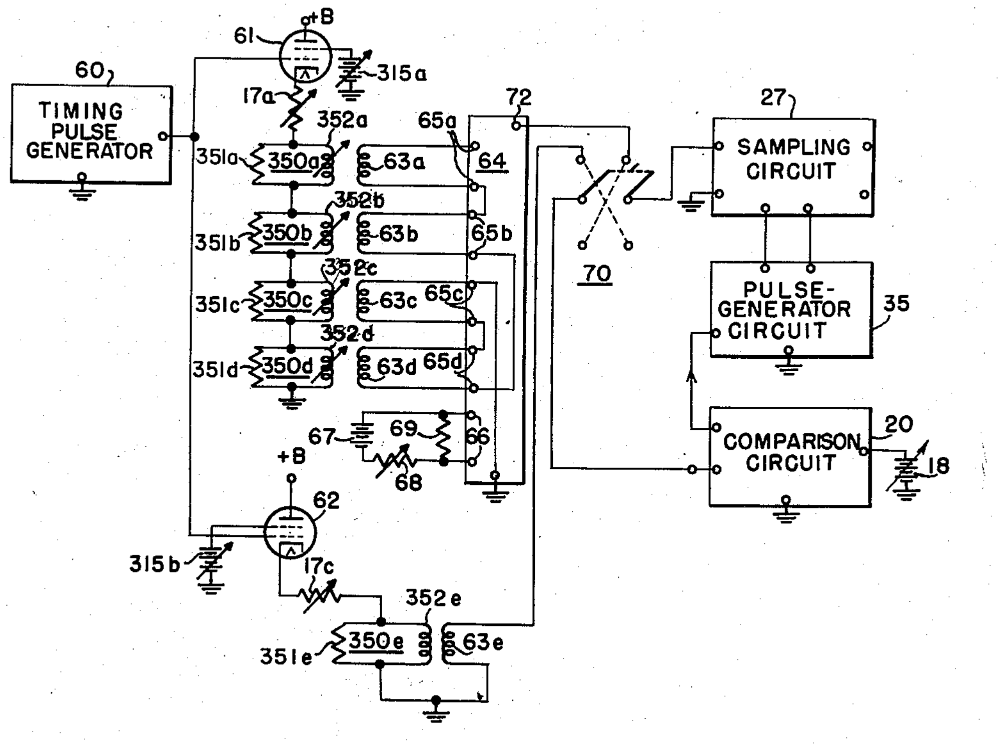
Figure 2:
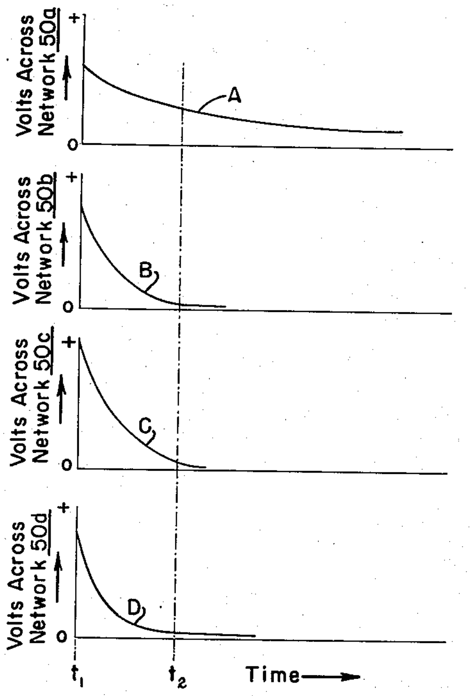
Figure 7:
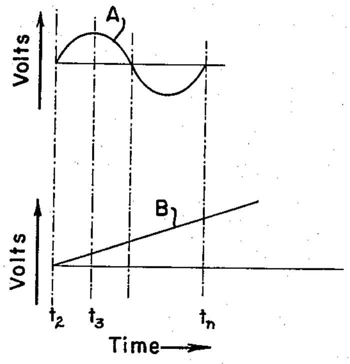
Figure 4:
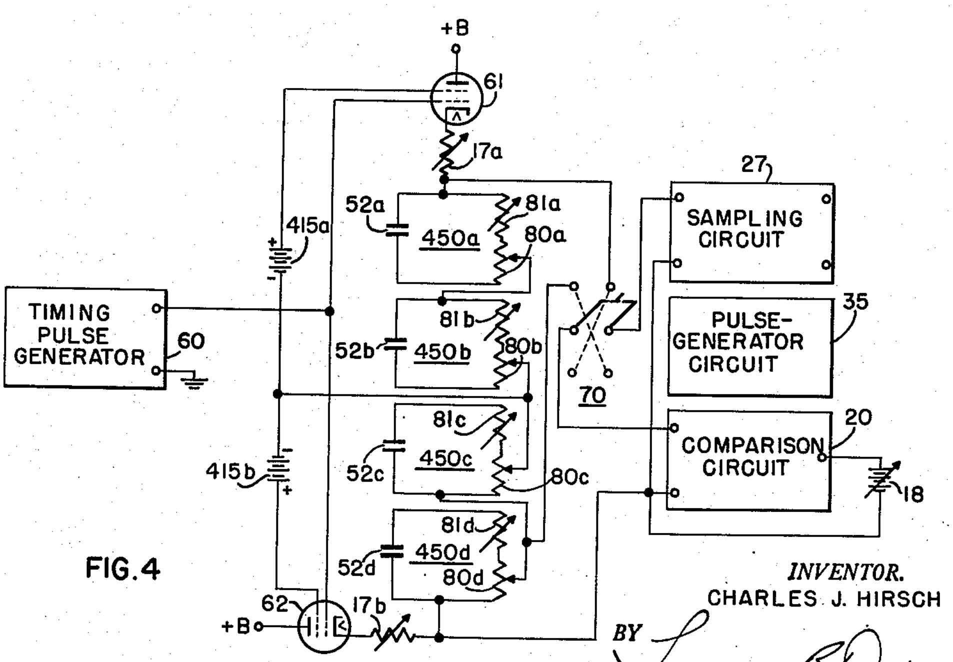
Figures 5, 5A:
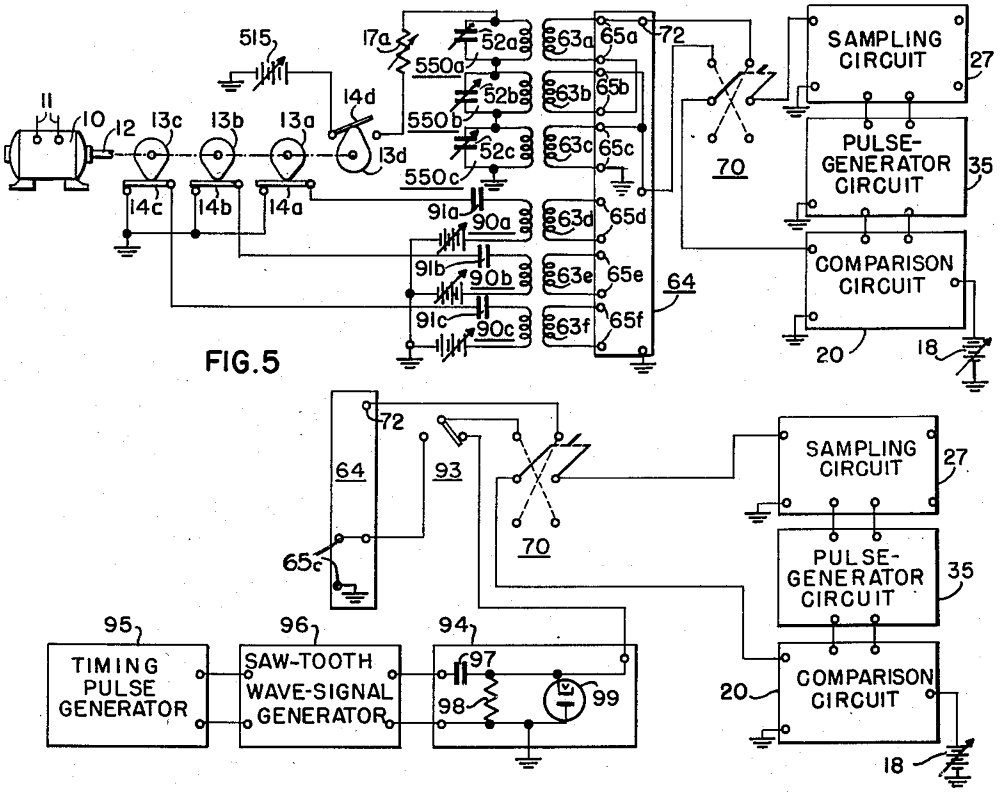
Figure 6:
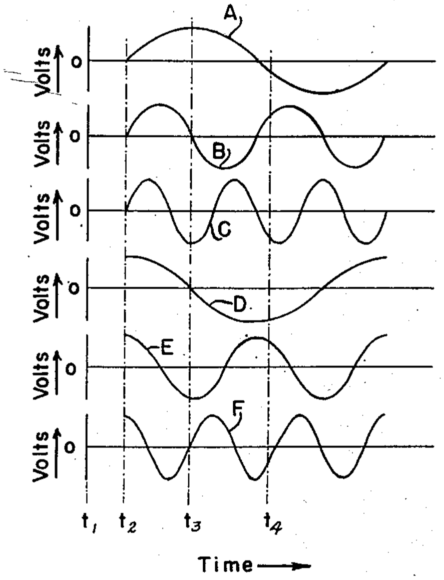

Referring now to the drawings, Fig. 1 is a circuit diagram of an electrical computer embodying the present invention in a particular form; Fig. 2 is a graph useful in explaining the operation of the Fig. 1 computer; Figs. 3 and 4 are circuit diagrams, partly schematic, of modified forms of the computer represented in Fig. 1; Fig. 5 is a circuit diagram, partly schematic, of another embodiment of the invention; Fig. 5*a* is a schematic diagram of a modified form of the computer of Fig. 5; Fig. 6 is a graph useful in explaining the operation of the Fig. 5 computer; and Fig. 7 is a graph useful in explaining the operation of the Fig. 5*a* computer.

*Description of computer of Fig. 1*

Referring now to Fig. 1 of the drawings, there is represented a circuit diagram of an electrical computer for solving equations involving mathematical series, particularly power series, including both known and unknown parameters. The computer comprises means for supplying an electrical signal, including an electrical motor 10 energized in a conventional manner through a pair of terminals 11, 11 and having a shaft 12 mechanically coupled to a cam 13. The supplying means also includes a switch 14 connected in series with a battery 15 and arranged to be controlled by the cam 13. One terminal of each of the milliameters 16*a*, 16*b* and 16*c* is connected to the battery 15 through the switch 14 and through corresponding ones of variable resistors 17*a*, 17*b* and 17*c*.

The computer also comprises a plurality of networks 50*a*—50*e*, inclusive, each in the form of parallel-connected resistor-condenser circuits at least some of which are electrically coupled in series relation with the signal-supplying means. The networks 50*a* and 50*b* are coupled in series between one terminal of the milliameter 16*a* and the negative terminal of the battery 15. Related networks 50*c* and 50*d* are coupled between the battery terminal just mentioned and one of the terminals of the milliameter 16*b* and the network 50*e* is coupled between one of the terminals of the milliameter 16*c* and the negative terminal of the battery 15. Each of the networks 50*a*—50*e*, inclusive, has circuit elements, specifically a resistor and a condenser connected in parallel, so proportioned as, upon application of the aforementioned electrical signal thereto, to develop in each circuit an electrical effect varying as a predetermined time function which, at a predetermined instant of time, reaches a value representative of one of the terms of the mathematical series. The time function is preferably an exponentially decaying one, and the predetermined instant of time is one determined by an independent-variable known parameter of the mathematical series.

The circuit elements of the network 50*a* are a resistor 51*a* and a condenser 52*a*, the other networks including analogous arrangements of resistors and condensers, each designated by the same number as the corresponding element in the network 50*a* with letter suffixes corresponding to the letter suffixes of the network of which the element is a part. For reasons which will be explained more fully hereinafter, the impedances of these networks are proportioned with respect to each other in the ratio of individual ones of one group of components of the terms of the mathematical series and the time constants of the networks are proportioned with respect to each other in the ratio of individual ones of another group of components of the terms of the series. More specifically, these networks are proportioned to have time constants related to each other in the ratio of the exponents of the terms of the mathematical series to be solved and the condensers and resistors thereof have values which will develop different initial voltages related to the factorial terms in the series. The resistors 17*a*, 17*b* and 17*c* are each adjustable to permit preselected amounts of current to flow through their respective circuits.

The computer also comprises a source of potential having a value representative of a known parameter, the independent-variable known parameter, specifically at battery 18 adjustable to supply potentials of selectable values. The battery 18 is connected to terminals 19, 19 of a comparison circuit 20 to be described more fully in the following paragraph.

The computer also comprises means jointly responsive to the potential of the source 18 and at least one of the aforementioned electrical effects at the aforesaid predetermined instant of time for developing a control effect, this means being, specifically the comparison circuit 20. The unit 20 includes a tube 21 having a cathode connected through a cathode load resistor 22 to one terminal of the battery 18 and a control electrode coupled to the other terminal thereof, both connections being made through the terminals 19, 19. The anode of the tube 21 is connected to a source of potential +B. The cathode of the tube 21 is coupled through a resistor 23 to the anode of a diode 24, this anode also being coupled through a condenser 25 to a terminal 26. The cathode of the diode 24 is coupled through one of a pair of terminals 45, 45 to one terminal of the network 50*e*, the other side of the network being coupled through another one of the terminals 45, 45 to one of the terminals 19, 19.

The computer also comprises a signal-sampling circuit 27 of the bridge rectifier type preferably comprising four diodes 28, 29, 30 and 31 arranged in a conventional bridge rectifier circuit. One pair of diagonally disposed terminals of this bridge circuit is coupled to at least one of the networks and preferably connected across the networks 50*a*—50*d*, inclusive, through a pair of terminals 32, 32 and a load resistor 33. The resistor 33 has a storage condenser 43 coupled in parallel therewith. The other pair of diagonally disposed terminals of the bridge is connected through a biasing battery 54, a pair of terminals 34, 34 and a pulse-generator circuit 35 to the output terminal 26 of the comparison circuit 20.

The pulse-generator circuit 35 is of the blocking oscillator type and includes a vacuum tube 36 having an anode coupled through one of a pair of terminals 37 to the terminal 26 of the unit 20 and through one winding of a transformer 38 to a source of potential +B. Another winding of the transformer 38 has one terminal thereof connected to the control electrode of the tube 36 and the other terminal thereof coupled through a resistor 39 to a source of biasing potential −C. The terminal of the resistor 39 which is not connected to the source −C is connected to a pulse-forming delay line 40, the remote end of which is open circuited. The cathode of the tube 36 and one terminal of the delay line 40 are connected to the other one of the terminals 37, 37, which terminal is also connected to the junction of the networks 50*b* and 50*c*. The output winding of the transformer 38 is coupled through the terminals 41, 41 to the terminals 34, 34 in the signal-sampling circuit 27. If the signal applied to terminals 37, 37 is of insufficient magnitude, a pulse amplifier may be included between these terminals and the anode circuit of the tube 36.

*Operation of the computer of Fig. 1*

The operation of the computer of Fig. 1 will now be described with reference to the group of curves in the graph of Fig. 2 which represent the voltage decay of the networks 50*a*—50*e*, inclusive, with respect to time. In order that the curves of Fig. 2 may be shown aligned with reference to their time coordinates, the scale factors of the ordinates thereof are different. To this end, curve A has an ordinate scale factor of unity, curve C has an ordinate scale factor of one-quarter unity and curves B and D have ordinate scale factors of approximately one-tenth unity. Considering now the operation of the computer of Fig. 1, some time prior to the time $t_1$ represented in Fig. 2, in each cycle the motor 10 causes the cam 13 momentarily to close the switch 14 thereby causing current to flow in the networks 50*a*—50*e*, inclusive. Because of the values of the resistors and condensers in each of the networks, each thereof is charged to a peak potential of a different value at the time $t_1$. For the solution of a specific problem to be discussed more fully hereinafter, the network 50*a* is charged to a potential of approximately 6.28 volts as represented by curve A of Fig. 2, the network 50*b* is charged to a potential of approximately 81 volts as represented by curve B, the network 50*c* is charged to a potential of approximately 41 volts as represented by curve C and the network 50*d* is charged to a potential of approximately 75.5 volts as represented by curve D. The network 50*e* may also be charged to a potential similar to that of the network 50*a* and may also be represented by curve A of Fig. 2, though, as will be seen hereinafter, it may be desirable to utilize a different scale factor for the network 50*e* than that of the network 50*a*. The battery 18 has been adjusted to develop a desired potential between the control electrode and cathode of the tube 21 in the comparison circuit 20. A portion of this potential by the well known cathode-follower action is effectively developed across the cathode load resistor 22. Therefore, the difference in potential between the voltage across the network 50*e* and the voltage across the resistor 22 appears across the series combination of the resistor 23 and the diode 24.

At the time $t_1$ when the cam 13 permits the switch 14 to disconnect the battery 15 from the networks, the condenser in each network commences to discharge exponentially through the resistor therein in the manner represented by the respective curves of Fig. 2. When the voltage across the network 50*e* drops just below the potential across the resistor 22 in the unit 20 at time $t_2$, the diode 24 conducts to develop across the resistor 23 a pulse of voltage having negative polarity. This latter voltage is applied through the condenser 25 to the pulse-generator circuit 35 at this time. The leading edge of this pulse initiates the generation of a single potential pulse of short duration in the pulse generator 35. The duration of the pulse generated in the unit 35 is determined by the time required for a pulse to travel a round trip in the delay line 40 and be applied to the control electrode of the tube 36. This duration is selected to be just great enough to provide for adequate sampling of the voltage then present across the networks 50*a*—50*d*, inclusive, at and immediately after the time $t_2$.

The pulse developed in the output circuit of the generator 35 is applied through the terminals 34, 34 with such polarity and magnitude as to overcome the biasing potential developed by the battery 54. Accordingly, the bridge circuit including the tubes 28—31, inclusive, is rendered conductive for the duration of the applied pulse with the result that substantially the sum of the voltages then existing across the networks 50*a*—50*d*, inclusive, is developed across the resistor 33 and stored in condenser 43. It will be seen that the voltage developed across the resistor 33 represents the difference in voltage across the networks 50*a*, 50*b* and the networks 50*c*, 50*d*, being representative of the algebraic sum of the potentials across the networks 50*a*—50*d*, inclusive. Therefore, if the voltage in each network is representative of a term of a mathematical series, the voltage across the resistor 33 is representative of the sum of these terms.

The manner in which the Fig. 1 computer may be utilized to perform computations, specifically to solve mathematical series, will be more fully apparent from the following mathematical analysis of its operation as explained with reference to both Figs. 1 and 2. Assume it is desired to have the computer solve the following well-known type equation:

$$E_0 \sin \theta = E_0\left(\theta - \frac{\theta^3}{3!} + \frac{\theta^5}{5!} - \frac{\theta^7}{7!} + \cdots - \frac{\theta^n}{n!} + \cdots\right) \quad (1)$$

Since in Equation 1 $\theta$ is required to be expressed in terms of radians and, in applicant's computer, is to be expressed in terms of volts the following equation is useful:

$$\theta = K\frac{e}{E_1} \quad (2)$$

where $E_1$=a voltage representative of one radian $e$=a voltage proportional to $\theta$ in the same units as $E_1$, $e \leq E_1$, and $K$=a multiplication factor needed to compensate for the fact that the term $e/E_1$ is unable to represent an angle greater than unity, that is, one radian.

By utilizing the relationships of Equation 2, Equation 1 may be expressed as follows:

$$E_0 \sin K\frac{e}{E_1}=E_0\left(K\frac{e}{E_1}-\frac{1}{3!}\left(K\frac{e}{E_1}\right)^3+\frac{1}{5!}\left(K\frac{e}{E_1}\right)^5-\frac{1}{7!}\left(K\frac{e}{E_1}\right)^7+\cdots-\frac{1}{n!}\left(K\frac{e}{E_1}\right)^n+\cdots\right) \quad (3)$$

In order to arrange the terms in the Equation 3 in a manner more suitable for use in the computer of Fig. 1, the following relationships may be employed:

$$E_0K\frac{e}{E_1}=iR\epsilon^{-\frac{t_2}{RC}} \quad (4)$$

where $i$=the steady-state current in amperes flowing through the resistors of the resistor-condenser (RC) circuits of Fig. 1 just prior to the opening of switch 14, that is, just prior to the time $t_1$.

$R$=the resistance in ohms in the RC circuits $C$=the capacitance in farads in the RC circuits, and $t_2$=the elapsed decay time of an RC circuit from time zero, that is, time $t_1$.

In Equation 4

$$E_0\,K=iR=\text{a constant} \quad (5)$$

and $$\frac{e}{E_1}=\epsilon^{-\frac{t_2}{RC}} \quad (6)$$

likewise $$\left(\frac{e}{E_1}\right)^n=\left[\epsilon^{-\frac{t_2}{RC}}\right]^n=\epsilon^{-\frac{nt_2}{RC}}=\epsilon^{-\frac{t_2}{\left[\frac{RC}{n}\right]}} \quad (6a)$$

Using the relationships in Equations 4–6, inclusive, the Equation 3 may then be rewritten as follows:

$$E_0 \sin K\frac{e}{E_1}=iR_1\epsilon^{-\frac{t_2}{R_1C_1}}-iR_3\left[\epsilon^{-\frac{t_2}{R_1C_1}}\right]^3+iR_5\left[\epsilon^{-\frac{t_2}{R_1C_1}}\right]^5-iR_7\left[\epsilon^{-\frac{t_2}{R_1C_1}}\right]^7+\cdots-iR_n\left[\epsilon^{-\frac{t_2}{R_1C_1}}\right]^n+\cdots \quad (7)$$

When Equations 3 and 7 are compared and the relationships of Equations 4 and 5 are utilized, it is seen that:

$$iR_n=E_0\frac{K^n}{n!}=iR_1\frac{K^{n-1}}{n!} \quad (8)$$

and thus $$R_n=R_1\frac{K^{n-1}}{n!} \quad (9)$$

Equation 7 in view of Equation 9 may now be expressed in the form:

$$E_0 \sin K\frac{e}{E_1}=iR_1\left[\frac{e}{E_1}-\frac{K^2}{3!}\left(\frac{e}{E_1}\right)^3+\frac{K^4}{5!}\left(\frac{e}{E_1}\right)^5-\frac{K^6}{7!}\left(\frac{e}{E_1}\right)^7+\cdots\frac{K^{n-1}}{n!}\left(\frac{e}{E_1}\right)^n+\cdots\right] \quad (10)$$

Equation 10 may be utilized in the computer of Fig. 1 to solve mathematical series of the type represented by Equation 1.

Assume now that it is desired to determine the value of sin $\theta$, where $\theta$ is equal to $\pi$, $E_0$ is equal to 1, and K is equal to $2\pi$. Then, in accordance with Equation 2

$$\sin\theta=\sin K\frac{e}{E_1}=\sin\left(2\pi\frac{e}{E_1}\right) \quad (11)$$

Therefore, $$2\pi\frac{e}{E_1}=\theta=\pi \quad (12)$$

and $$\frac{e}{E_1}=\frac{1}{2}=\epsilon^{-\frac{t_2}{R_1C_1}} \quad (13)$$

Also in accordance with Equation 8

$$iR_1=E_0K=6.28 \quad (14)$$

Thus, by utilizing Equations 10, 13 and 14:

$$\sin\pi=6.28\left(\frac{1}{2}-\frac{6.28^2}{3!}\left(\frac{1}{2}\right)^3+\frac{6.28^4}{5!}\left(\frac{1}{2}\right)^5-\frac{6.28^6}{7!}\left(\frac{1}{2}\right)^7+\cdots\right) \quad (15)$$

Referring now to Fig. 1, as previously stated the networks 50a—50e, inclusive, are individually proportioned to represent terms of the Equation 10 above. Networks 50a and 50e are proportioned to represent the first term of the Equation 10, specifically $$iR_1\frac{e}{E_1}$$

where $iR_1$=6.28 volts in accordance with Equation 14 and $$\frac{e}{E_1}=\frac{1}{2}$$

at the time the terms of the series in Equation 15 are added to determine the value of sin $\pi$. Since the networks 50a and 50e are, arbitrarily, the first networks to have their parameters determined, they may have any suitable time constant, and any suitable value of the resistors 51a and 51e may be utilized. For simplicity, a time constant of $10^{-3}$ seconds and a value of 1,000 ohms for the resistors 51a and 51e are selected, the condensers 52a and 52e thereby being determined to have values of one microfarad.

Since the voltage developed across the resistor 51a should initially equal 6.28 volts, the resistor 17a is adjusted to permit a current of 6.28 milliamperes to flow through the meter 18a and, therefore, through each of the resistors 51a and 51b. Similarly the resistor 17b is adjusted to cause a corresponding amount of current to flow through the resistors 51c and 51d though it is to be understood that if suitable scale factor corrections are made, the current flowing in the resistors 51c and 51d may differ from that flowing in the resistors 51a and 51b. For scale factor purposes and in order that the operation of the comparison circuit 20 may be less critical and therefore more accurate, it may be desirable to make the voltage scale of the battery 13 and across the network 50e one-twentieth of the voltage scale utilized in the network 50a. Thus, whereas the network 50a may have a voltage equal to 6.28 volts thereacross, the network 50e may be charged to an initial voltage of 20×6.28 or 125.6 volts. Since the voltages in the networks 50a—50d, inclusive, are to be added when the network 50a has decayed to have a voltage equal to one-half 6.28, the battery 18 is adjusted to have a voltage of one-half 125.6 volts, or 62.8 volts, this being one-half of the initial voltage across the network 50e.

Having selected the time constant and resistor values for the network 50a representing the first term of the series defined by Equation 15, the corresponding values of the networks 50b—50d, inclusive, are determined by Equation 10 above. Specifically, the time constants of the networks 50a—50d, inclusive, are arranged to be in the ratio of the powers of the exponential component of the terms which the networks represent. The network 50c representing the second term of the series is proportioned to have a time constant one-third that of the network 50a, since the exponential term of the second term of the series is indicated as being raised to the third power. In a similar manner the network 50b representing the third term and the network 50d representing the fourth term of the Equation 15 are proportioned to have, respectively, time constants one-fifth and one-seventh that of the time constant of the network 50a. Equation 9 determines the values of the resistors 51b—51d, inclusive, based on the value of the resistor 51a. Thus the resistor 51c is:

$$R_3 = R_1\frac{(2\pi)^2}{3!} = 1{,}000\ \frac{(2\pi)^2}{3!} = 6{,}550 \text{ ohms} \quad (16)$$

Similarly, the resistor 51b equals 12,900 ohms and the resistor 51d equals 12,200 ohms. The values of the condensers 52b—52d, inclusive, are determined in the conventional manner by the selected time constants and resistor values for the networks.

Having proportioned the networks 50a—50e, inclusive, in the manner just described, these networks now represent four terms of the power series for the sine functions, specifically of the series for sin $\pi$. In the manner previously described, the networks 50a—50e, inclusive, are charged by potentials obtained from the battery 15. As represented by Fig. 2 the initial voltage across the network 50a is approximately 6.28 volts; across the network 50b is approximately 81 volts; across the network 50c is approximately 41 volts; and across the network 50d is approximately 76.5 volts, these voltages being determined by the relative values of the resistors in the networks. Because of the scale factor difference, the initial voltage across the network 50e is, as has been previously stated, 125.6 volts. At the time $t_2$ when the voltage across the network 50e is equal to the voltage across the battery 18, specifically 62.8 volts, the voltage across the network 50a is equal to 3.14 volts and is therefore representative of the first term of Equation 15. Also at the time $t_2$, the voltage across the network 50b is equal to the value of the third term, the voltage across the network 50c is equal to the value of the second term and the voltage across the network 50d is equal to the value of the fourth term of the Equation 15. As indicated by the Equation 15 the voltages in the network 50a representing the first term and the voltage in the network 50b representing the third term should be added, while the voltages in the network 50c representing the second term and in the network 50d representing the fourth term should also be added, the latter sum being substracted from the first-mentioned sum. This operation is effected by arranging the networks in the manner previously described so that the sampling circuit 27 develops across the resistor 33 the algebraic sum of the voltages in the networks 50a—50d, inclusive. It will be seen that this sum is the same as that determined by solving the Equation 15 in a conventional manner for the sine of $\pi$.

*Description of computer of Fig. 3*

There has previously been described a simplified arrangement for solving mathematical problems involving series functions in which, for purposes of simplicity of explanation, the networks having characteristics individually related to the terms of the series have been described as having predetermined time constants and resistor and condenser values. It should be understood that for purposes of flexibility in solving problems of the type under consideration, such networks do not usually have predetermined fixed characteristics but rather include adjustable elements so that any desired time-constant value and any desired impedance value for a network may be obtained. In this way many different problems may be solved. Fig. 3 represents a computer including a plurality of inductor resistor networks having greater flexibility in the electrical characteristics obtainable therefrom than the resistor condenser networks of the computer of Fig. 1. In describing and explaining the operation of the computer of Fig. 3, since the computers of Fig. 1 and Fig. 3 are related, similar components thereof are designated by the same reference numerals and analogous components by the same reference numerals with a factor of 300 added thereto.

There is included in the computer represented by Fig. 3 of the drawings, a timing pulse generator 60 which may be a multivibrator for periodically developing electrical signals and may be adjustable in the frequency of operation thereof. The output circuit of the generator 60 is coupled to control electrodes in a pair of electron-discharge devices, specifically tetrode tubes 61 and 62. The tubes 61 and 62 each have the anodes thereof connected to a source of potential +B and the screen electrodes thereof individually and respectively coupled to batteries 315a and 315b. The cathodes of the tubes 61 and 62 are coupled through load resistors 17a and 17c, respectively, to inductor resistor networks 350a—350d, inclusive, and 350e, respectively. Networks 350a—350d, inclusive, are connected in series between the load resistor 17a and ground while the network 350e is connected between the load resistor 17c and ground. Each of the networks 350a—350e, inclusive, includes a resistor connected in parallel with a variable inductor and having another inductor inductively coupled to the first-mentioned inductor. The amount of coupling between the inductors is adjustable to effect any desired amount thereof, thereby to proportion the magnitudes of the impedances of the networks with respect to each other, as viewed from the terminals on a terminal block 64, in the ratio of the coefficients of the terms of the mathematical series. Specifically, the network 350a includes a resistor 351a and an inductor 352a having an inductor 63a inductively coupled thereto and the networks 350b—350e each include analogous arrangements of resistors and inductors each designated by the same number as the corresponding element in the network 350a with letter suffixes corresponding to the letter suffixes of the network of which the element is a part. Each of the secondary inductors 63a—63d, inclusive, is connected to a pair of terminals on a terminal block 64. For example, the inductor 63a is connected to terminals 65a, 65a and the other inductors are connected to other pairs of terminals designated by similar numerals and having letter suffixes corresponding to the associated network. There is also coupled to a pair of terminals 66, 66 on the terminal block 64 a circuit including a battery 67, a variable resistor 68 and a load resistor 69 connected in series, the terminals 66, 66 being connected across the load resistor 69.

The terminal block 64 includes an output terminal 72 and may be of any conventional type permitting connections to be made from any terminal to any other terminal thereon. Switchboard type arrangements may be employed and, if desired, an elaborate switching system may be used in place of the plugs and jacks on a switchboard. The output terminal 72 of the terminal block 64 is effectively coupled through a double-pole double-throw switch 70 either to the input circuit of the sampling circuit 27 or of the comparison circuit 20. Similarly the secondary winding 63e of the network 350e is coupled through the switch 70 either to the unit 27 or the unit 20. The switch 70 is so arranged that when the output terminal 72 of the terminal block 64 is coupled to either the unit 27 or the unit 20 the winding 63e is coupled to the other thereof.

*Explanation of operation of the computer of Fig. 3*

Considering now the operation of the computer of Fig. 3, as previously explained with reference to the computer of Fig. 1, the networks 350a—350e, inclusive, have the elements thereof adjusted so that the time constants of the different networks are proportional to the exponents of the different terms of the series and so that the amount of coupling between the primary and secondary windings in each network is proportional to the factorial coefficient of the different terms of the series. The timing pulse generator 60 operates in a conventional manner, through the means of the tubes 61 and 62 and the batteries 315a and 315b, to cause current to flow in each of the inductor resistor networks 350a—350e, inclusive. By means of the terminal block 64 the voltages across the different secondary windings 63a—63d, inclusive, may be combined additively or subtractively by appropriate connections of the terminals of one secondary winding to those of another secondary winding. Thus to solve the Equation 10, previously solved by the computer of Fig. 1, the secondary windings 63a and 63b are so connected that the voltages developed therein are additive as are the secondary windings 63c and 63d but the group including the windings 63a and 63b is connected so that the voltages developed therein combine subtractively with the voltages developed in the group including the windings 63c and 63d.

The circuit including the battery 67 and the resistors 68 and 69 provides a means for developing in the output circuit of the computer networks a fixed potential related to a fixed factor which might be present in the series function to be added to the terms thereof. Thus in the solution of the series for the cosine of an angle the first term thereof is a fixed term and might be represented by the voltage developed across the terminals 66, 66.

The double-pole double-throw switch 70 provides a means for arranging the computer to solve for the sum of a series as described with reference to the computer of Fig. 1 or, knowing the sum thereof, to solve for the value of any term of the series or for the value of the variable in each term of the series. Thus the value of sin $\theta$ may be determined or knowing the value thereof the angle $\theta$ may be found. When the switch 70 is in one operating position so as to couple the output circuit of the terminal block 64 to the sampling circuit 27 and the secondary winding 63e to the comparison circuit 20, the solution of the series is as previously described with reference to Fig. 1. When the switch 70 is in the other operating condition thereof the output circuit of the terminal block 64 is coupled to the comparison circuit 20 and the winding 63e is coupled to the sampling circuit 27. It is seen that in this position when the comparison circuit determines that the voltages across the networks 63a—63d, inclusive, represent the sum of a certain series, for example, sin $\pi$, the potential across the secondary winding 63e is sampled and represents the term $\pi$. In this manner knowing the sum of the series but not knowing what angle the series represents, the value of the angle may be determined.

*Description and explanation of operation of the computer of Fig. 4*

The computer of Fig. 4 is related to the computer of Fig. 3 but utilizes resistor condenser networks instead of inductor resistor networks. In addition, the arrangement of the networks of Fig. 4 is similar to the arrangement described with reference to Fig. 1. Therefore, with reference to Fig. 4, components and elements similar to those of Figs. 1 and 3 are represented by the same reference numerals and analogous components by the same reference numerals with the factor of 400 added thereto with respect to the units of Fig. 1.

Each of the networks 450a—450d, inclusive, includes a pair of variable resistors connected in series and a condenser connected in parallel therewith. Thus the network 450a includes a condenser 52a and a pair of variable resistors 80a and 81a. The same referencing system previously used with respect to the elements of the networks of Figs. 1 and 3 is also used with respect to the resistors and condensers in the networks 450a—450d, inclusive, of Fig. 4. The resistors 81a—81d, inclusive, are adjustable to determine the time-constant characteristics of the different networks. The resistors 80a—80d, inclusive, are adjustable to determine the relative initial voltages to be developed across the different networks and, therefore, are adjusted in the different networks to represent the coefficient of the term represented by the network.

Considering now the operation of the computer of Fig. 4, it is seen that the time constants of the networks are such that the networks individually develop voltages varying as predetermined time functions individually related to the exponent of a term of the series. The resistors 80a—80d, inclusive, are adjustable to relate the networks 450a—450d, inclusive, in a manner representative of the relationship of the coefficients of the terms of the series. The networks 450a—450d, inclusive, are energized by the timing pulse generator 60 in the manner described with reference to Fig. 3.

The network 450d in the computer of Fig. 4 serves the dual purpose of developing a voltage representing one of the terms in the mathematical series, which term is to be added to the other terms thereof to obtain the sum of the series, and also representing the control voltage the value of which at some time activates the comparison circuit 20 to effect the adding of the terms. The possibility of an arrangement of this type was discussed with relation to the computer of Fig. 1.

The computers represented by Figs. 1, 3 and 4 have been described as being capable of solving power-series type equations and an explanation of the manner in which such computers solve equations of this type has been presented. The equation utilized as an example is one in which the exponents of the terms thereof are integers. It should be understood that computers of the type described in accordance with the present invention are not limited to solving equations having such exponents. Power-series equations having exponents which are not integers may be solved with equal facility. Thus an equation of the type $$y=ax^{0.6}+bx^{1.7}+cx^{2.34}+\ldots \qquad (17)$$

may be solved by properly proportioning the time constants of the networks relative to one another to represent the relative values of the exponents of the different terms of the equation, as shown in Equation 6a. Therefore, the exponents may be either integers or nonintegers. By utilizing equations having noninteger exponential terms, fewer terms of the equation may be required to ascertain the convergence of the equation.

*Description of computer of Fig. 5*

The computers discussed previously herein are designed primarily to solve power-series type equations. The computer now to be described and represented by Fig. 5 is designed to solve Fourier-type equations. Since many of the components of the computer of Fig. 5 are related to components in the computers of Figs. 1 and 3, similar ones thereof are designated by the same reference numerals and analogous ones by the same reference numerals with a factor of 500 added to the reference numbers used in Fig. 1 for such units.

In the computer of Fig. 5, the shaft 12 of motor 10 includes a plurality of cams 13*a*—13*d*, inclusive, mechanically coupled thereto. The cams 13*a*—13*c*, inclusive, are arranged to close a plurality of switches 14*a*—14*c*, inclusive, at the time the cam 13*d* opens a switch 14*d*.

The computer of Fig. 5 also includes a plurality of resonant networks each having input and output circuits and arranged in a plurality of groups. At least the input circuits of the networks of at least one of these groups are electrically coupled in series relation. Thus the networks 550*a*—550*c*, inclusive, each including inductively coupled inductors, having a condenser in parallel with one of the inductors, comprise one group, the input circuits of the networks of which are coupled in series through the resistor 17*a*, the switch 14*d* and a battery 515. At least the input circuits of the networks of another of the above-mentioned groups are electrically independent of each other. Thus networks 90*a*—90*c*, inclusive, each also including inductively coupled inductors, comprise another one of these groups, each network thereof including a closed circuit of an inductor, a condenser, a battery and one of the switches 14*a*—14*c*, inclusive.

The motor 10, the cams 13*a*—13*d*, inclusive, the switches 14*a*—14*d*, inclusive, together with the battery 515 and the battery in each of the networks 90*a*—90*c*, inclusive, comprise an energizing means. This energizing means is arranged collectively to energize the networks 550*a*—550*c*, inclusive, at one instant of time by the operation of the switch 14*d* and individually to energize the networks 90*a*—90*c*, inclusive, at a later instant of time by the individual operations of the switches 14*a*—14*c*, inclusive.

Each of the networks 550*a*—550*c*, inclusive, and 90*a*—90*c*, inclusive, have circuit elements, specifically the condensers and inductors thereof, so proportioned and the coupling between the inductors so arranged that upon being energized there is developed in each network an oscillating signal, the oscillating signals in the networks 550*a*—550*c*, inclusive, being out of phase with the oscillating signals in the networks 90*a*—90*c*, inclusive. Individual ones of the networks 550*a*—550*c*, inclusive, and 90*a*—90*c*, inclusive, are proportioned to have different resonance characteristics so that the signal developed in each network has a frequency peculiar to the developing network. More specifically, as will be better understood hereinafter, the resonance characteristics of the networks 550*a*—550*c*, inclusive, and 90*a*—90*c*, inclusive, are related to each other in the ratio of the angles of the sine and cosine terms in the mathematical series to be solved and the coefficients of coupling of the inductors in each network are related to each other substantially in the ratio of the coefficients of the terms of the mathematical series. Stated more generally, since a resonant circuit is a time-constant circuit having a complex time constant of $e^{-j\omega t}$, that is, the magnitude of a voltage therein varies with time as defined by $e^{-j\omega t}$, the time constants of such networks are proportioned with respect to each other in the ratio of individual ones of a group of components of the terms of the mathematical series, that is, in the ratio of the angles of the sine and cosine terms. The impedances of such networks are proportioned by adjusting the coefficient of coupling of the inductors as described.

As in the computer of Fig. 3, the terminal board 64 is arranged to couple the output circuits of the networks 550*a*—550*c*, inclusive, and the networks 90*a*—90*c*, inclusive, in any desired manner. The connections represented on the board 64 in Fig. 5 relate to the coupling desired for the solution of a problem to be discussed hereinafter.

*Explanation of operation of computer of Fig. 5*

Considering now the operation of the computer of Fig. 5, and referring to the curves of Fig. 6, upon closing the switch 14*d* at a time $t_1$ the current flowing through the networks 550*a*—550*c*, inclusive, slowly increases to a value determined by the voltage of the battery 515 and the resistor 17*a*. The voltage across each of the networks 550*a*—550*c*, inclusive, and, therefore, across the secondary inductors 63*a*—63*c*, inclusive, is essentially zero because of the slowness with which the current builds up to its final value, most of the voltage being developed across the resistor 17*a*. Upon opening the switch 14*d* at a time $t_2$, the current in each of the networks 550*a*—550*c*. inclusive, cannot immediately drop to zero due to the inductance in these networks and, therefore, the condensers 52*a*—52*c*, inclusive, are charged. This charging results in producing in each of the networks 550*a*—550*c*, inclusive, an oscillation at a frequency determined by the parameters of the individual networks to develop signals in the inductors 63a—63c, inclusive, having relative amplitudes determined by the impedances of the different networks and the coefficients of coupling of the inductors in each network. The signals developed in the networks 550a—550c, inclusive, assuming that fundamental and second and third harmonic signals of equal amplitudes are developed in individual ones thereof, may be represented respectively by the curves A—C, inclusive, of Fig. 6.

Also, at the time $t_2$, the closing of the switches 14a—14c, inclusive, shock excites the networks 90a—90c, inclusive, into oscillation at frequencies determined by their parameters to develop signals in the inductors 63d—63f, inclusive, having relative amplitudes determined as described with reference to the inductors 63a—63c, inclusive. The signals developed in the networks 90a—90c, inclusive, assuming that these networks have the same relative relationships as those described with reference to the networks 550a—550c, inclusive, may be represented respectively by the curves D—F, inclusive, of Fig. 6. It is seen that while the signals represented by the curves A—C, inclusive, start from zero potential, the signals represented by the curves D—F, inclusive, start at a maximum potential because the full battery voltage in each of the networks 90a—90c, inclusive, is applied instantaneously across the inductors in these networks, the condensers 91a—91c, inclusive, being unable to charge instantaneously. It is also seen that the curves A—C, inclusive, are related to the curves D—F, inclusive, in the same manner as sine and cosine functions are related, the curves D—F, inclusive, being out of phase with the curves A—C, inclusive, as a cosine function is out of phase with a sine function.

The computer of Fig. 5 may be utilized to solve functions involving Fourier series-type relations. Thus the computer of Fig. 5 could be utilized to determine the harmonic composition of a saw-tooth wave defined as follows:

$$y=\frac{2}{\pi}E\left(\sin x-\frac{1}{2}\sin 2x+\frac{1}{3}\sin 3x-\cdots\right) \quad (18)$$

where $E$=the maximum amplitude of the saw-tooth wave in volts, and $x$=the measurement along the $x$ axis or ordinate of the wave in radians.

It is seen that the solution for $y$ in Equation 18 is approximated by adding the values of three sine terms and multiplying them by a constant. Therefore, in solving an equation of the type represented by Equation 18, only the networks 550a—550c, inclusive, need be employed and the frequency of the signals developed in these networks would be related to the angular relationship of the terms in the equation. The effective coupling between the inductors would be determined by the coefficients of the terms in the equation. Also, the networks representing the first and third terms in the equation would be combined additively while the network representing the second term would be combined subtractively in the manner previously described with reference to Fig. 3. Thus, assuming that the networks 550a and 550c represent the first and third terms of Equation 18 and the network 550b represents the second term thereof, the output circuits of these networks through means of the terminal board 64 would be combined as indicated in Fig. 5. The solution of an equation of the type represented by Equation 18 can, therefore, be readily understood.

If cosine terms were involved in the equation, one or more of the networks 90a—90c, inclusive, would be required and the output circuits thereof would be so coupled with the output circuits of the networks 550a—550c, inclusive, in the terminal board 64 that the sum thereof would represent the sum of the terms in the equation.

The manner in which the units 20, 35, 27 and the switch 70 are employed is fully described with reference to the computer of Fig. 3.

*Description and explanation of operation of portion of computer of Fig. 5a*

The computer of Fig. 5 as has been previously stated, is arranged to solve Fourier-type equations. It is limited in being able to solve only for the sum of the series when the value of one term thereof is known or for a term when the value of the sum is known. As represented by Fig. 5 the computer is unable to solve for the sum of the series for any given value of an angle of one of the terms in the series. The arrangement of Fig. 5a does not have this limitation.

In Fig. 5a units similar to those of Fig. 5 are designated by the same reference numerals. In addition to such units, the arrangement of Fig. 5a includes a single-pole double-throw switch 93, one of the stationary terminals of which is connected to the terminal board 64, to one of the terminals 65c thereon, and the other of which is connected to an output circuit of a zero-adjusting circuit 94. The movable contact of the switch 93 is connected to a terminal of the double-pole double-throw switch 70. A timing pulse generator 95 of a type previously described herein with reference to Fig. 3 and a saw-tooth wave-signal generator 96 are connected in cascade with the input circuit of the unit 94. The saw-tooth wave-signal generator 96 may be of conventional type, a suitable circuit being disclosed in "Principles of Radar" published by McGraw-Hill Book Company, Inc., New York, New York (second edition 1946), page 3–20, Fig. 10. The unit 94 provides for the initiation of the saw-tooth wave at zero voltage at a given time and comprises a coupling condenser 97 in series with a resistor 98 across the input circuit of the unit 94. The resistor 98 has coupled in shunt thereto a diode 99 having a grounded anode.

Referring now to Fig. 7 there is represented by curve A, a sine wave similar to that represented by curve A in Fig. 6 and developed in the output circuit of one of the networks described with reference to Fig. 5. The saw-tooth wave-signal generator 96 has parameters so proportioned that the potential of the saw-tooth wave developed therein and represented by curve B of Fig. 7 has zero potential at the time $t_2$, the time of the initiation thereof and of the initiation of the sine wave represented by curve A. At the time $t_3$ the saw-tooth wave has a potential representing the angle of 90° in the sine wave represented by the curve A. Similarly, the saw-tooth wave is arranged to have potentials at other related times individually representing different angles of the sine wave. As a result, if a highly linear saw-tooth wave is developed, the potentials therealong between zero and the maximum potential at time $t_n$, will represent angles between 0 and 360°. If, therefore, the switch 93 is connected to the output circuit of the zero-adjusting circuit 94 and the blades of the switch 70 are closed in contact with the upper set of terminals thereof, there is continuously developed across the input circuit of the comparison circuit 20, a potential representative of angles between 0 and 360°. Therefore, in the manner previously described, the comparison circuit 20 by suitable adjustment of the battery 18, may determine the sum of the series developed in the networks of the computer for any given angle between 0 and 360°. This sum, in the manner previously described, is represented as a potential in the output circuit of the sampling circuit 21.

The timing pulse generator 95 acts in a conventional manner repetitively to develop a saw-tooth wave of the type just described for every full cycle of the determining sine wave as represented by curve A of Fig. 7. The zero-adjusting circuit 94 assures that the saw-tooth wave developed in the generator 96 will always start from zero potential.

There have been described herein computers in accordance with the present invention which are capable of solving all types of mathematical series problems and it is to be understood that such computers are essentially mathematical function generators. Such computers are not only capable of solving series functions of the conventional type but can also solve any equations capable of being expressed in the form of a series function. It is in this broader sense that the term "mathematical series" is utilized herein.

While there have been described what are at present considered to be the preferred embodiments of this invention, it will be obvious to those skilled in the are that various change and modifications may be made therein without departing from the invention, and it is, therefore, aimed in the appended claims to cover all such changes and modifications as fall within the true spirit an scope of the invention.

What is claimed is:

1. An electrical computer for solving equations having known and unknown parameters and involving mathematical series including terms each having an exponent and a multiplier and comprising: a signal-generating circuit for periodically supplying an electrical signal; a plurality of time-constant networks at least some of which are electrically coupled in series relation with said signal-generating circuit and each thereof having circuit elements so proportioned that the impedances of said networks are proportioned with respect to each other in the ratio of said multipliers of said terms and the time constants of said networks are proportioned with respect to each other in the ratio of said exponents of said terms and impedance characteristic so that, upon application of said electrical signal thereto, there is developed in each thereof a different voltage varying as a predetermined time function which, at an instant of time determined by an independent-variable known parameter of said mathematical series reaches a value representing one of the terms of said mathematical series; a source of potential having a value representative of said independent-variable known parameter; means for utilizing said potential of said source and at least one of said voltages at said instant of said time to develop a control effect; and a signal-sampling circuit coupled to said utilizing means and to at least one of said networks and responsive to said control effect for determining the value of at least one of said voltages at said instant of time to derive a resultant voltage representative of the value of an unknown parameter of said mathematical series.

2. An electrical computer for solving equations involving mathematical series including known and unknown parameters comprising: means for supplying an electrical signal; a plurality of networks at least some of which are electrically coupled in series relation with each other and with said supplying means and each having circuit elements so proportioned that the impedances of said networks are proportioned with respect to each other in the ratio of individual ones of one group of components of the terms of said mathematical series and the time constants of said networks are proportioned with respect to each other in the ratio of individual ones of another group of components of the terms of said mathematical series so that upon application of said electrical signal to said networks there are developed therein electrical effects varying as predetermined time functions which at a predetermined instant of time reach in individual ones of said networks values representative of different ones of the terms of said mathematical series; a source of potential having a value representative of a known parameter at said predetermined instant of time; means responsive jointly to said potential of said source and at least one of said electrical effects at said predetermined instant of time for developing a control effect; and a signal-sampling circuit responsive to said control effect and coupled to at least one of said networks for determining the value of said electrical effects developed therein at said predetermined instant of time, thereby to derive a resultant electrical effect representative of the value of an unknown parameter of said mathematical series.

3. An electrical computer for solving equations involving mathematical series including known and unknown parameters and terms having coefficients and exponents comprising: means for supplying an electrical signal; a plurality of resistor-condenser networks at least some of which are electrically coupled in series relation with said supplying means and the magnitudes of the resistors and condensers of said networks being so proportioned that the impedances of said networks are proportioned with respect to each other in the ratio of the coefficients of the terms of said mathematical series and the time constants of said networks are proportioned with respect to each other in the ratio of the exponents of the terms of said series so that upon application of said electrical signal to said networks there are developed therein electrical effects varying as predetermined time functions which at a predetermined instant of time reach in individual ones of said networks values representative of different ones of the terms of said mathematical series; a source of potential having a value representative of a known parameter at said predetermined instant of time; means responsive jointly to said potential of said source and at least one of said electrical effects at said predetermined instant of time for developing a control effect; and a signal-sampling circuit coupled to said responsive means and to at least one of said networks for determining the value of at least one of said electrical effects at said predetermined instant of time, thereby to derive a resultant electrical effect representative of the value of an unknown parameter of said mathematical series.

4. An electrical computer for solving equations involving mathematical series including known and unknown parameters and terms having coefficients and exponents comprising: means for supplying an electrical signal; a plurality of inductor-resistor networks at least some of which are electrically coupled in series relation with said supplying means and the magnitudes of the resistors and inductors of said networks being so proportioned that the impedances of said networks are proportioned with respect to each other in the ratio of the coefficients of the terms of said mathematical series and the time constants of said networks are proportioned with respect to each other in the ratio of the exponents of the terms of said series so that upon application of said electrical signal to said networks there are developed therein electrical effects varying as predetermined time functions which at an instant of time determined by an independent-variable known parameter of said mathematical series reach in individual ones of said networks values representative of different ones of the terms of said mathematical series; a source of potential having a value representative of said independent-variable known parameter; means responsive jointly to said potential of said source and at least one of said electrical effects at said instant of said time for developing a control effect; and a signal-sampling circuit coupled to said responsive means and to at least one of said networks and responsive to said control effect for determining the value of at least one of said electrical effects at said instant of said time, thereby to derive a resultant electrical effect representative of the value of an unknown parameter of said mathematical series.

5. An electrical computer for solving equations involving mathematical series including known and unknown parameters and terms having coefficients comprising: means for supplying an electrical signal; a plurality of inductor-condenser networks at least some of which are electrically coupled in series relation with said supplying means and the magnitudes of the inductors and condensers of said networks being so proportioned that the impedances of said networks are proportioned with respect to each other in the ratio of the coefficient of the terms of said mathematical series and the resonant frequencies of said networks are proportioned with respect to each other in the ratio of individual ones of another group of components of the terms of said series so that upon application of said electrical signal to said networks there are developed therein electrical effects varying as predetermined time functions which at an instant of time determined by an independent-variable known parameter of said mathematical series reach in individual ones of said networks values representative of different ones of the terms of said mathematical series; a source of potential having a value representative of said independent-variable known parameter; means responsive jointly to said potential of said source and at least one of said electrical effects at said instant of said time for developing a control effect; and a signal-sampling circuit coupled to said responsive means and to at least one of said networks and responsive to said control effect for determining the value of at least one of said electrical effects at said instant of said time, thereby to derive a resultant electrical effect representative of the value of an unknown parameter of said mathematical series.

6. An electrical computer for solving equations involving mathematical series including known and unknown parameters comprising: means for supplying an electrical signal; a plurality of networks at least some of which are electrically coupled in series relation with each other and with said supplying means and each having circuit elements so proportioned that the impedances of said networks are proportioned with respect to each other in the ratio of individual ones of one group of components of the terms of said mathematical series and the time constants of said networks are proportioned with respect to each other in the ratio of individual ones of another group of components of the terms of said mathematical series so that upon application of said electrical signal to said networks there are developed therein electrical effects varying as predetermined time functions which at an instant of time determined by an independent-variable known parameter of said mathematical series reach in individual ones of said networks values representative of different ones of the terms of said mathematical series; a source of potential having a value representative of said independent-variable known parameter; means jointly responsive to said potential of said source and at least one of said electrical effects at said instant of said time for developing a control effect; and a signal-sampling circuit responsive to said control effect and coupled across a plurality of said networks in series for determining the value of the sum of said electrical effects developed therein of said networks in series at said instant of said time, thereby to derive a resultant electrical effect representative of the value of the sum of the terms of said mathematical series.

7. An electrical computer for solving equations involving mathematical series including known and unknown parameters comprising: means for supplying an electrical signal; a plurality of networks at least some of which are electrically coupled in series relation with each other and with said supplying means and each having circuit elements so proportioned that the impedances of said networks are proportioned with respect to each other in the ratio of individual ones of one group of components of the terms of said mathematical series and the time constants of said networks are proportioned with respect to each other in the ratio of individual ones of another group of components of the terms of said mathematical series so that upon application of said electrical signal to said networks there are developed therein electrical effects varying as predetermined time functions which at an instant of time determined by an independent-variable known parameter of said mathematical series reach in individual ones of said network values representative of different ones of the terms of said mathematical series; a source of potential having a value representative of said independent-variable known parameter; means jointly responsive to said potential of said source and at least one of said electrical effects at said instant of said time for developing a control effect; a switching circuit having at least two operating conditions; and a signal-sampling circuit coupled through said switching circuit to said responsive means and to at least one of said networks and responsive to said control effect for determining the value of at least one of said electrical effects at said instant of said time, thereby to derive a resultant electrical effect representative of the value of an unknown parameter of said mathematical series.

8. An electrical computer for solving equations involving mathematical series including known and unknown parameters comprising: means for supplying an electrical signal; a plurality of networks arranged in a plurality of groups, those in each of said groups being electrically coupled in series relation with each other and with said supplying means and each network having circuit elements so proportioned that the impedances of said networks are proportioned with respect to each other in the ratio of individual ones of one group of components of the terms of said mathematical series and the time constants of said networks are proportioned with respect to each other in the ratio of individual ones of another group of components of the terms of said mathematical series so that upon application of said electrical signal to said networks there are developed therein electrical effects varying as predetermined time functions which at an instant of time determined by an independent-variable known parameter of said mathematical series reach in individual ones of said networks values representative of different ones of the terms of said mathematical series; a source of potential having a value representative of said independent-variable known parameter; means jointly responsive to said potential of said source and at least one of said electrical effects at said instant of said time for developing a control effect; and a signal-sampling circuit responsive to said control effect and coupled to at least one of said networks for determining the value of said electrical effects developed therein at said instant of said time, thereby to derive a resultant electrical effect representative of the value of an unknown parameter of said mathematical series.

9. An electrical computer for solving equations involving mathematical power series including known and unknown parameters and terms having coefficients and exponents comprising: means for supplying an electrical signal; a plurality of resistor-condenser networks at least some of which are electrically coupled in series relation with said supplying means and the magnitudes of the resistors and condensers of said networks being so proportioned that the impedances of said networks are proportioned with respect to each other in the ratio of the coefficients of the terms of said mathematical series and the time constants of said networks are proportioned with respect to each other in the ratio of the exponents of the terms of said series so that upon application of said electrical signal to said networks there are developed therein voltages varying as exponentially decaying time functions which at an instant of time determined by an independent-variable known parameter of said mathematical series reach in individual ones of said networks values representative of different ones of the terms of said mathematical series; a source of potential having a value representative of said independent-variable known parameter; means jointly responsive to said potential of said source and at least one of said voltages at said instant of said time for developing a control effect; and a signal-sampling circuit coupled to said responsive means and to at least one of said networks and responsive to said control effect for determining the value of at least one of said voltages at said instant of said time, thereby to derive a resultant voltage representative of the value of an unknown parameter of said mathematical series.

10. An electrical computer for solving equations having known and unknown parameters and involving mathematical series including terms each having an exponent and a multiplier and comprising: a signal-generating circuit for periodically supplying an electrical signal; a plurality of time-constant networks at least some of which are electrically coupled in series relation with each other and with said signal-generating circuit and each thereof including at least inductors inductively coupled in pairs and circuit elements including said inductors so proportioned that the coefficients of coupling of said pairs of said inductors of said networks are proportioned with respect to each other in the ratio of said multipliers of said terms and the time constants of said networks are proportioned with respect to each other in the ratio of said exponents of said terms so that, upon application of said electrical signal thereto, there is developed in an inductor in each thereof a different voltage varying as a predetermined time function which, at an instant of time determined by an independent-variable known parameter of said mathematical series reaches a value representing one of the terms of said mathematical series; a source of potential having a value representative of said independent-variable known parameter; means for utilizing said potential of said source and at least one of said voltages at said instant of said time to develop a control effect; and a signal-sampling circuit coupled to said utilizing means and to at least one of said networks and responsive to said control effect for determining the value of said voltages developed therein at said instant of said time to derive a resultant voltage representative of the value of an unknown parameter of said mathematical series.

11. An electrical computer for solving equations involving mathematical series having at least sine or cosine terms and including known and unknown parameters; a plurality of resonant networks each having input and output circuits, arranged in a plurality of groups at least the input circuits of the networks of at least one of said groups being electrically coupled in series relation and at least the input circuits of the networks of another of said groups being electrically independent of each other; means for energizing said networks coupled in series and for energizing individual ones of said networks in said another of said groups; said networks each having circuit elements so proportioned that the impedances of said networks are proportioned with respect to each other in the ratio of individual ones of one group of components of the terms of said mathematical series and the resonant frequencies of said networks are proportioned with respect to each other in the ratio of individual ones of another group of components of the terms of said mathematical series so that upon being energized there is developed in each of said networks an oscillating signal which, at an instant of time determined by an independent-variable known parameter of said mathematical series, reaches a value representing one of the terms of said mathematical series; a source of potential having a value representative of said independent-variable known parameter; means for utilizing said potential of said source and at least one of said oscillating signals at said instant of said time to develop a control effect; and a signal-sampling circuit coupled to said utilizing means and to the output circuit of at least one of said networks and responsive to said control effect for determining the value of at least one of said oscillating signals at said instant of said time to derive an electrical effect representative of the value of an unknown parameter of said mathematical series.

12. An electrical computer for solving equations involving mathematical series having at least sine or cosine terms and including known and unknown parameters; a plurality of resonant networks each having input and output circuits, arranged in a plurality of groups at least the input circuits of the networks of at least one of said groups being electrically coupled in series relation and at least the input circuits of the networks of another of said groups being electrically independent of each other; means for energizing said networks coupled in series at an instant of time and for energizing individual ones of said networks in said another of said groups at the same instant of time; said networks each having circuit elements so proportioned that the impedances of said networks are proportioned with respect to each other in the ratio of individual ones of one group of components of the terms of said mathematical series and the resonant frequencies of said networks are proportioned with respect to each other in the ratio of individual ones of another group of components of the terms of said mathematical series so that upon being energized there is developed in each of said networks an oscillating signal which, at an instant of time determined by an independent-variable known parameter of said mathematical series, reaches a value representing one of the terms of said mathematical series; a source of potential having a value representative of said independent-variable known parameter; means for utilizing said potential of said source and at least one of said oscillating signals at said instant of said time to develop a control effect; and a signal-sampling circuit coupled to said utilizing means and to the output circuit of at least one of said networks and responsive to said control effect for determining the value of at least one of said oscillating signals at said instant of said time to derive an electrical effect representative of the value of an unknown parameter of said mathematical series.

13. An electrical computer for solving equations involving mathematical series having sine and cosine terms and including known and unknown parameters; a plurality of resonant networks each having input and output circuits, arranged in a plurality of groups at least the input circuits of the networks of at least one of said groups being electrically coupled in series relation and at least the input circuits of the networks of another of said groups being electrically independent of each other; means for energizing said networks coupled in series and for energizing individual ones of said networks in said another of said groups; said networks each having circuit elements so proportioned that the impedances of said networks are proportioned with respect to each other in the ratio of individual ones of one group of components of the terms of said mathematical series and the resonant frequencies of said networks are proportioned with respect to each other in the ratio of individual ones of another group of components of the terms of said mathematical series so that upon being energized there is developed in each of said networks an oscillating signal, said oscillating signals in said networks of said one group being out of phase with said oscillating signals in said networks of said other group, and each of said oscillating signals, at an instant of time determined by an independent-variable known parameter of said mathematical series, reaching a value representing one of the terms of said mathematical series; a source of potential having a value representative of said independent-variable known parameter; means for utilizing said potential of said source and at least one of said oscillating signals at said instant of said time to develop a control effect; and a signal-sampling circuit coupled to said utilizing means and to the output circuits of at least one of said networks and responsive to said control effect for determining the value of at least one of said oscillating signals at said instant of said time to derive an electrical effect representative of the value of an unknown parameter of said mathematical series.

14. An electrical computer for solving equations involving mathematical series having terms including sine or cosine components and coefficient components; a plurality of resonant networks each having input and output circuits, arranged in a plurality of groups at least the input circuits of the networks of at least one of said groups being electrically coupled in series relation and at least the input circuits of the networks of another of said groups being electrically independent of each other; means for energizing said networks coupled in series and for energizing individual ones of said networks in said another of said groups; said networks each having circuit elements so proportioned that the impedances of said networks are proportioned with respect to each other in the ratio of said coefficient components and the resonant frequencies of said networks are proportioned with respect to each other in the ratio of the angles of said sine and cosine components of said terms so that upon being energized there is developed in each of said networks an oscillating signal having a frequency peculiar to the developing network and which, at an instant of time determined by an independent-variable known parameter of said mathematical series, reaches a value representing one of the terms of said mathematical series; a source of potential having a value representative of said independent-variable known parameter; means for utilizing said potential of said source and at least one of said oscillating signals at said instant of said time to develop a control effect; and a signal-sampling circuit coupled to said utilizing means and to the output circuit of at least one of said networks and responsive to said control effect for determining the value of at least one of said oscillating signals at said instant of said time to derive an electrical effect representative of the value of an unknown parameter of said mathematical series.

15. An electrical computer for solving equations having known and unknown parameters and involving mathematical series, including terms each having a sine or cosine function and a multiplier, comprising: a plurality of resonant networks each having input and output circuits, arranged in a plurality of groups at least the input circuits of the networks of at least one of said groups being electrically coupled in series relation and at least the input circuits of the networks of another of said groups being electrically independent of each other; means for energizing said networks coupled in series and for energizing individual ones of said networks in said another of said groups; said networks each including at least inductively coupled inductors and having circuit elements including said inductors so proportioned and arranged that the coefficients of coupling of said coupled inductors are proportioned with respect to each other in the ratio of said multipliers of said terms and the resonant frequencies of said networks are proportioned with respect to each other in the ratio of the angles of said sine and cosine functions so that upon being energized there is developed in each of said networks an oscillating signal having a frequency and magnitude peculiar to the developing network and which, at an instant of time determined by an independent-variable known parameter of said mathematical series, reaches a value representing one of the terms of said mathematical series, said resonant characteristics of said networks being related to each other in the ratio of the angles of the sine or cosine of said terms and said coefficients of coupling being related to each other substantially in the ratio of said multipliers; a source of potential having a value representative of said independent-variable known parameter; means for utilizing said potential of said source and at least one of said oscillating signals at said instant of said time to develop a control effect; and a signal-sampling circuit coupled to said utilizing means and to the output circuit of at least one of said networks and responsive to said control effect for determining the value of at least one of said oscillating signals at said instant of said time to derive an electrical effect representative of the value of an unknown parameter of said mathematical series.

CHARLES J. HIRSCH.

References Cited in the file of this patent

UNITED STATES PATENTS

| Number | Name | Date |
|---|---|---|
| 2,558,430 | Goldberg | June 26, 1951 |

OTHER REFERENCES

"The Theory of Mathematical Machines"; F. J. Murray; 2nd ed. 1948; King's Crown Press; pages III-18.